United States Patent [19]

Murphy et al.

[11] Patent Number: 4,729,670
[45] Date of Patent: Mar. 8, 1988

[54] ROLLER BEARING

[75] Inventors: Richard F. Murphy, Torrington, Conn.; Thomas J. Daul, Green Bay, Wis.

[73] Assignee: The Torrington Company, Torrington, Conn.

[21] Appl. No.: 50,655

[22] Filed: May 18, 1987

[51] Int. Cl.[4] ............................................. F16C 29/06
[52] U.S. Cl. .......................................................... 384/44
[58] Field of Search ............................ 384/44, 43, 45; 168/168, 111, 167

[56] References Cited
U.S. PATENT DOCUMENTS 4,619,628 10/1986 Orain ...................................... 464/167
4,666,316 5/1987 Stark ....................................... 384/44

FOREIGN PATENT DOCUMENTS 2748044 5/1978 Fed. Rep. of Germany ...... 464/111
40016 3/1984 Japan .................................... 464/111

Primary Examiner—Lenard A. Footland
Attorney, Agent, or Firm—Frank S. Troidl

[57] ABSTRACT

The bearing is used on a mechanical machine part or apparatus part which allows linear movement of the part along a second machine part or apparatus part and also allows angularity of one part with respect to the second part. A generally rectangular roller block is provided with raceways around its entire periphery. Rollers fill all of the raceways. Two opposite raceways have their rollers enclosed; the other opposite raceways have rollers which are in exposed operating positions so that they may contact the second machine. The rollers are retained within the roller block by one or more roller retaining members.

6 Claims, 11 Drawing Figures

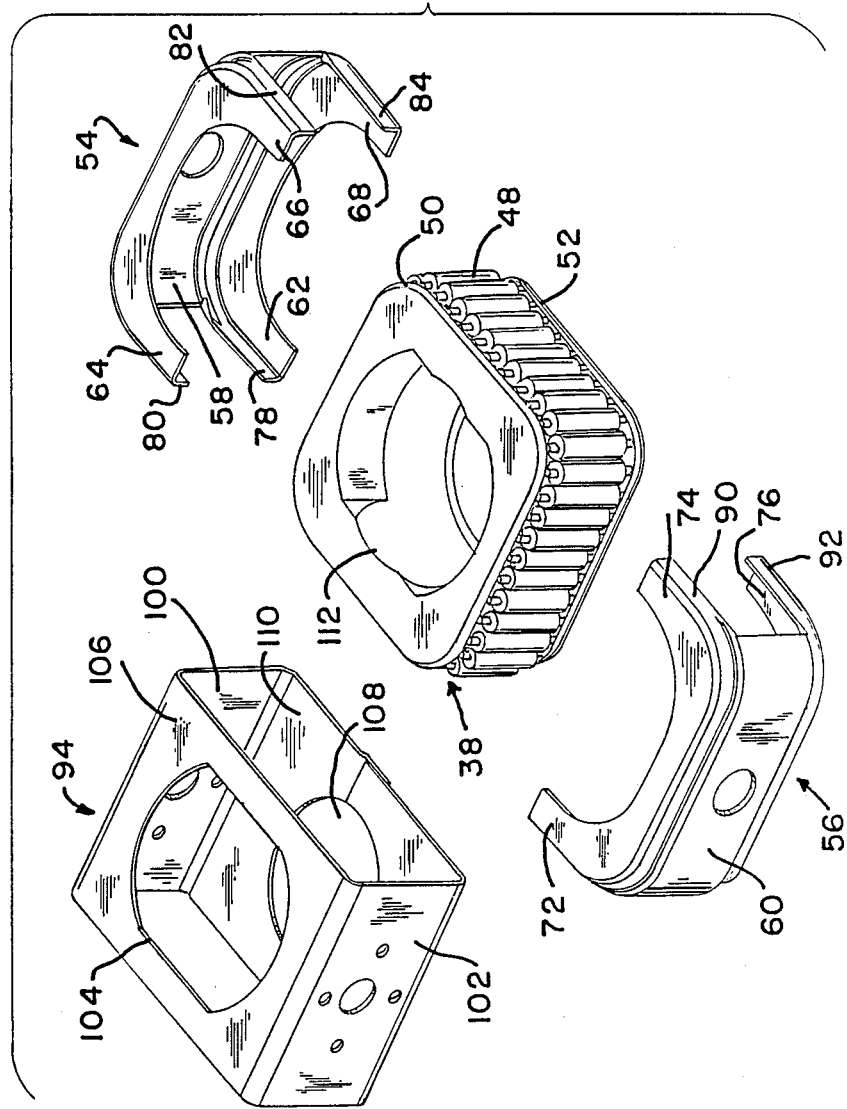

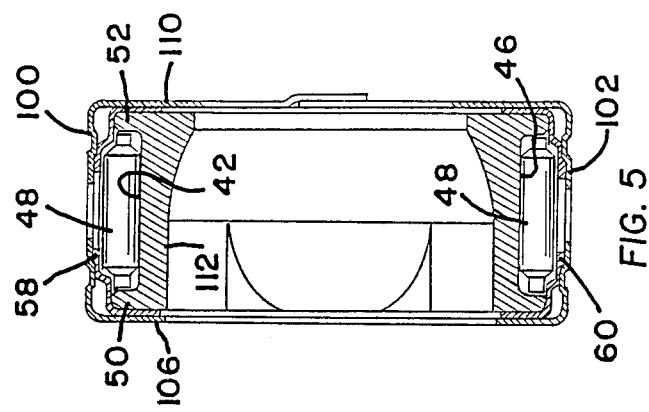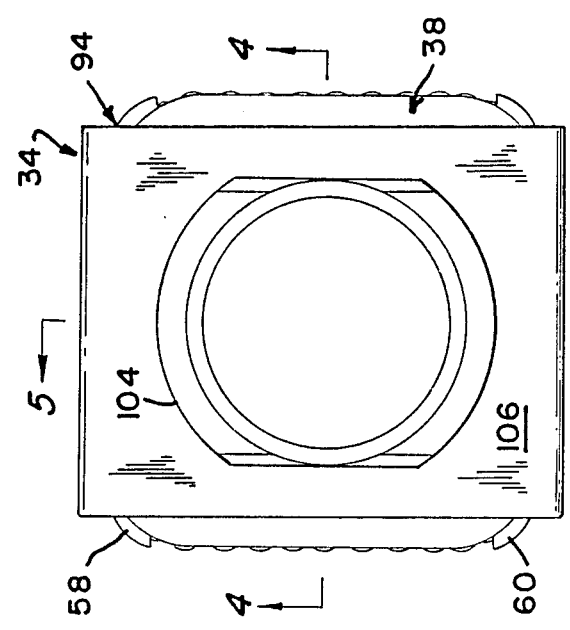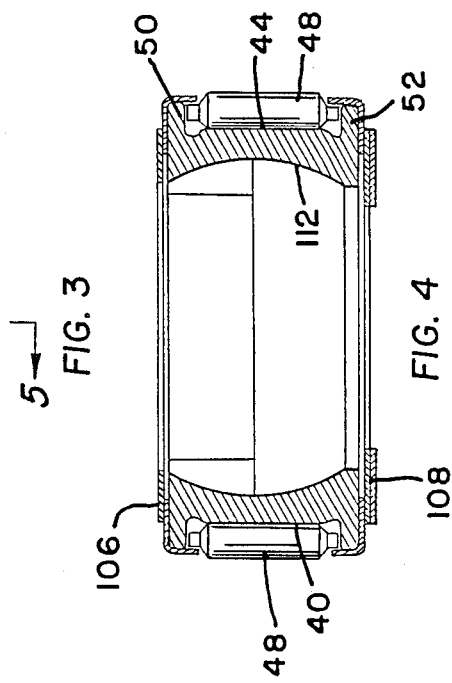

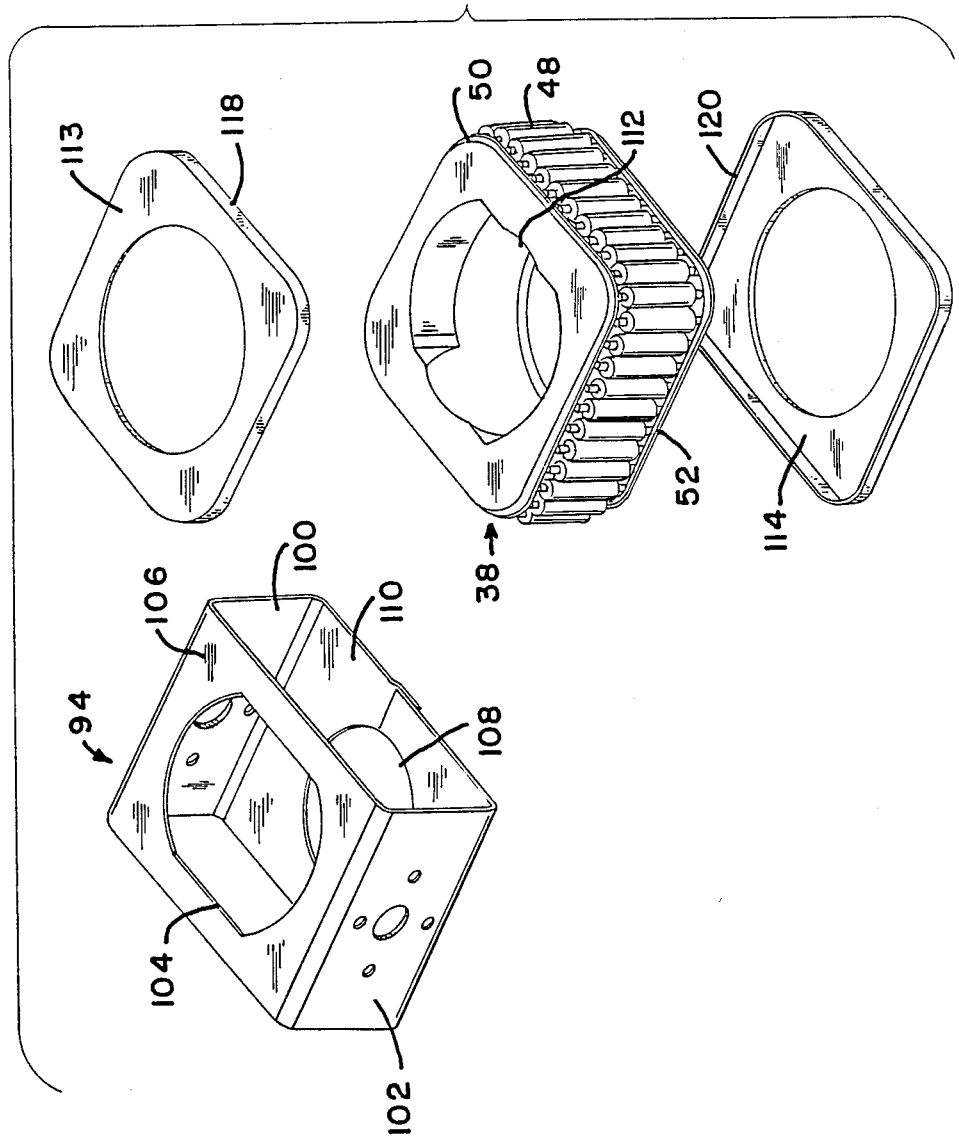

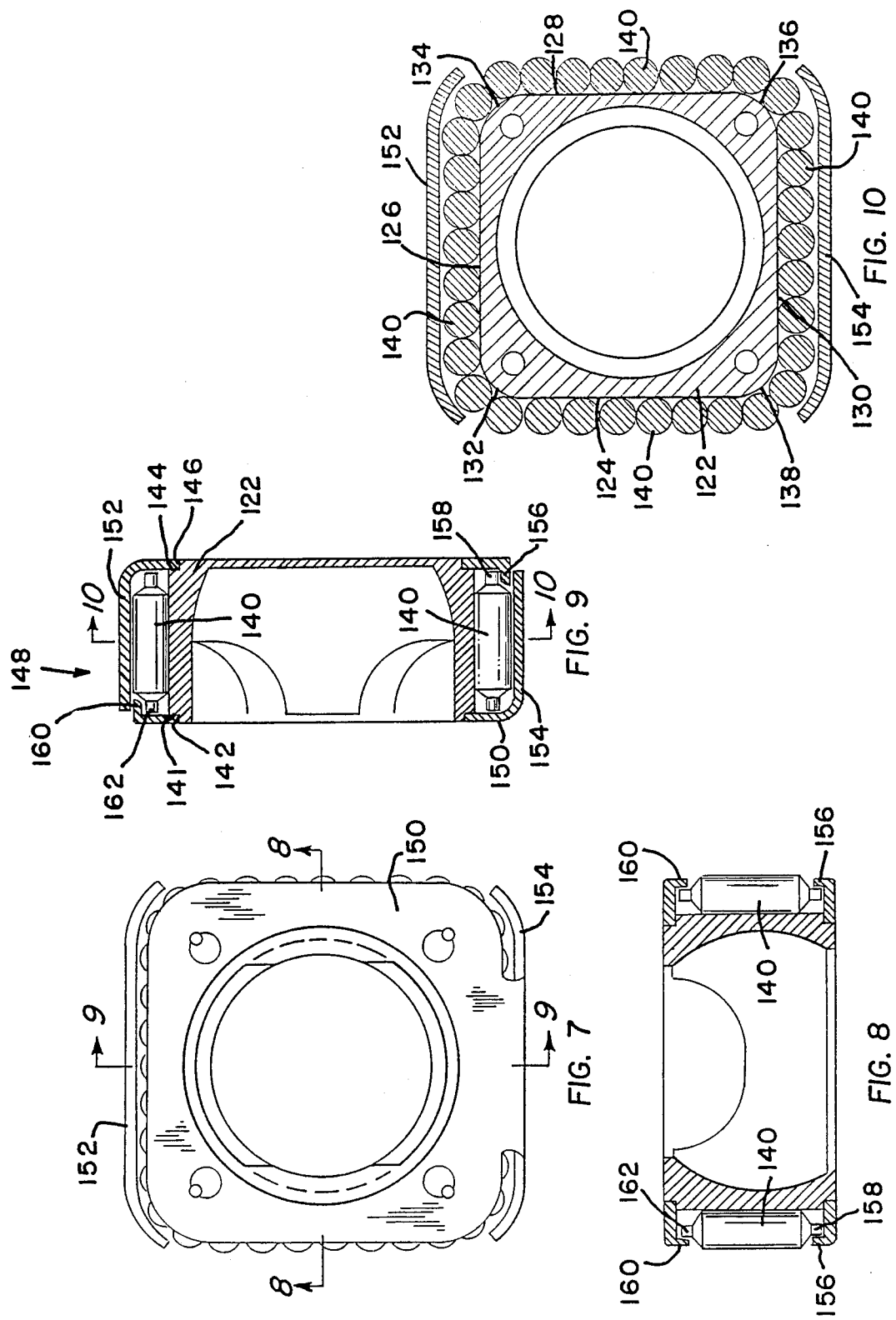

ROLLER BEARING

This invention relates to rolling contact bearings for machine parts or units where the bearing is constructed for straight-line motion and some angular motion. More particularly, this invention is a roller bearing which is useful, among other things, in a front wheel universal joint drive for motor vehicles.

The operation of certain machines which includes relatively movable parts often requires that one part have linear movement and also have angularity with respect to a second part. Often it is necessary that when an anti-friction bearing is used on one part, the bearing has straight raceways containing rollers in operational contact with raceways in the second machine part. For example, in many front wheel drive passenger cars the engine transfers power through a transmission to a drive shaft. The torque is transmitted to driven shafts through constant velocity torque transmitting universal joints. The universal joint includes a housing connected to the drive shaft, with the housing having three circumferentially equally separated pairs of parallel raceways. The driven shaft includes three circumferentially equally spaced apart rectangularly shaped anti-friction bearings each having opposite straight raceways with rollers in contact with universal joint housing outer races. The bearings are constructed to permit linear motion of the driven shaft with respect to the housing and also angularity of the shaft with respect to the housing.

This invention is a new bearing which is very useful, among other things, for use in a universal joint used in front wheel drive vehicles. Briefly described, the bearing has a generally rectangular roller block with four straight raceway outer surfaces and four curved raceway outer surfaces. A sufficient number of rollers to completely occupy the straight raceways and curved raceways but loose enough to permit rolling contact with the straight raceways and curved raceways are mounted around the raceways. The rollers are retained in the roller block by at least one member having roller enclosing portions with inside surfaces spaced from and enclosing a straight raceway and its adjacent curved raceways. The roller en-closing portions enclose opposite straight raceways and adjacent curved raceways, thereby providing opposite straight raceways with rollers in exposed operating positions. The roller retaining means also includes rims extending partially over those rollers in exposed operating positions to retain the rollers in the roller block.

The invention, as well as its many advantages, may be further understood by reference to the following detailed description and drawings in which:

FIG. 2 is an exploded view of a preferred embodiment of the invention;

FIG. 3 is a top view of the embodiment of FIG. 2 as assembled;

FIG. 4 is a sectional view taken along lines 4—4 of FIG. 3 and in the direction of the arrows;

FIG. 5 is a sectional view taken along lines 5—5 of FIG. 3 and in the direction of the arrows;

FIG. 6 is an exploded view of a second embodiment of the invention;

FIG. 7 is a top view of a third preferred embodiment of the invention;

FIG. 8 is a sectional view taken along lines 8—8 of FIG. 7 and in the direction of the arrows;

FIG. 9 is a sectional view taken along lines 9—9 of FIG. 7 and in the direction of the arrows;

FIG. 10 is a sectional view taken along lines 10—10 of FIG. 9 and in the direction of the arrows.

In the various figures, like parts are referred to by like numbers.

Figure 1:
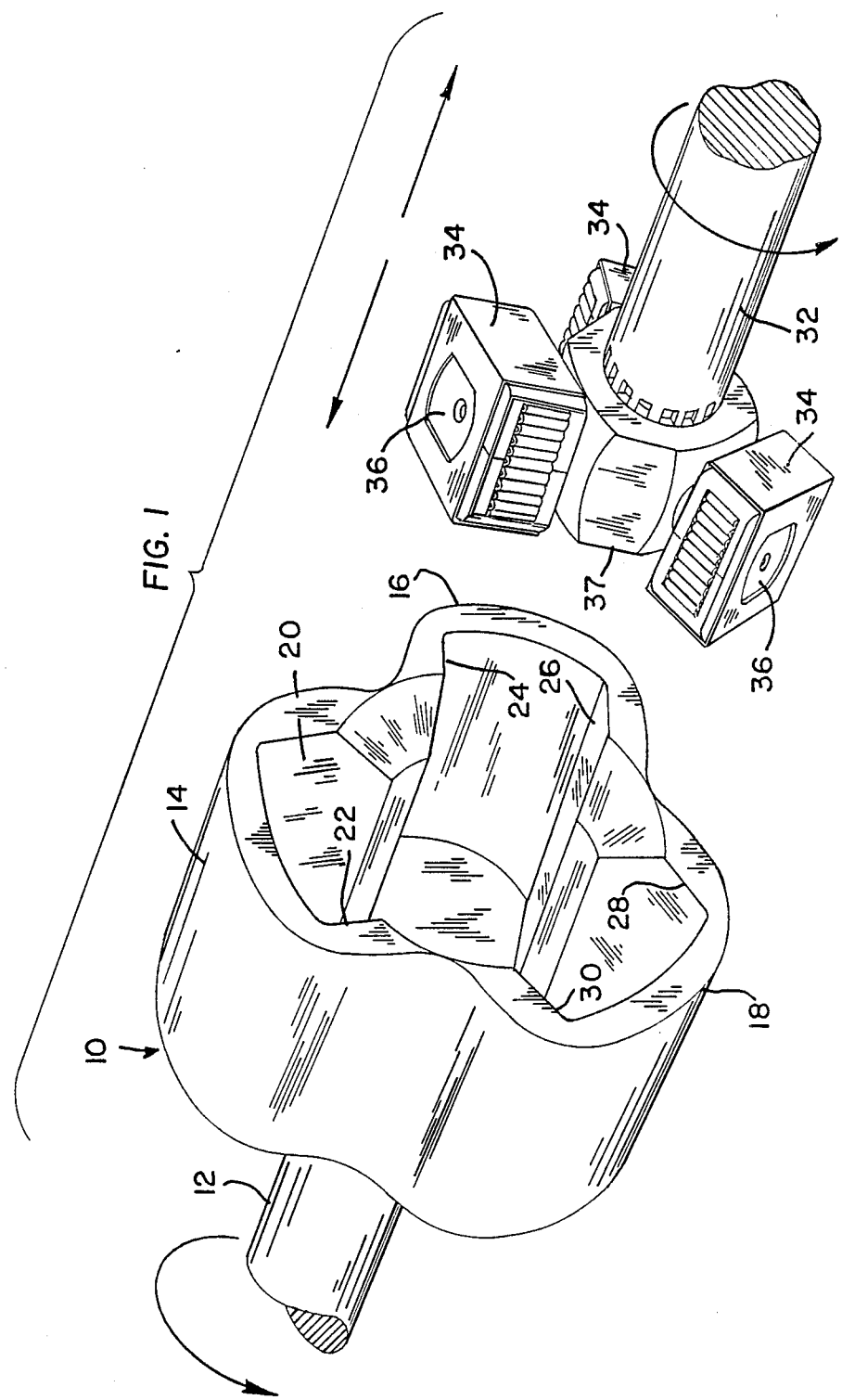
FIG. 1 is an exploded view of a constant velocity universal joint and illustrates one manner in which the new bearing may be used.

Referring to the drawings and more particularly to FIG. 1, the constant velocity universal joint includes a housing 10 rotated by drive shaft 12. The drive shaft 12 might be, for example, rotated by the transmission of a front wheel drive vehicle. The housing 10 includes three circumferentially equally spaced lobes 14, 16, and 18 serving as races. Race 14, has circumferentially separated straight raceways 20 and 22. Race 16 has circumferentially separated straight raceways 24 and 26. Race 18 has circumferentially separated straight raceways 28 and 30.

The drive shaft 12 rotates housing 10 which rotates the spider on driven shaft 32. Three circumferentially equally spaced bearings 34 are each mounted on one of three circumferentially equally spaced bearing supports 36 extending radially from a spider member 37 connected to the driven shaft 32. The driven shaft 32 may be connected, for example, to a constant speed universal joint for driving a front wheel of a passenger car.

As can be seen by referring to the arrows in FIG. 1, the drive shaft 12 rotates the driven shaft 32 in the direction of the curved arrows while at the same time permits the driven shaft 32 to move linearly in either direction along the spaced apart raceways in the outer races 14, 16, and 18. Also, the arrangement permits angular movement of the driven shaft 32 in the housing 10.

Referring to FIGS. 2 through 5, inclusive each bearing 34 includes a generally rectangularly shaped roller block 38. The entire outer periphery of the roller block 38 serves as roller raceways. Thus there are four straight raceway outer surfaces 40, 42, 44 and 46 (see FIG. 4 and FIG. 5). Referring to FIG. 2 and FIG. 3, it can be seen that each end of each straight raceway is connected to an end of its adjacent straight raceway by a curved raceway outer surface.

A plurality of trunnion rollers 48 completely surround the periphery of the roller block 38. There are a sufficient number of trunnion rollers 48 to completely occupy the straight raceways and curved raceways. However, the trunnion rollers 48 are loose enough to permit rolling contact with the straight raceways and curved raceways.

The rollers 48 are axially retained in the roller block 38 by outwardly extending flanges 50 and 52, one flange at each axial end of the roller block 38 extending around the entire periphery of the roller block 38.

A pair of roller block covers 54 and 56 are mounted over opposite straight and curved raceways. Each roller block cover 54 and 56 has a roller enclosing portion 58 and 60, respectively. The inside surfaces of roller enclosing portions 58 and 60 are spaced from and enclose a straight raceway 42 and 46, respectively, and the adjacent curved raceways (see FIG. 5), thereby providing opposite straight raceways 40 and 44 (see FIG. 4) containing trunnion rollers 48 which are in the exposed operating positions for contact with an outer raceway such as the outer raceways in the housing 10 (see FIG. 1) of the universal joint.

Roller block cover 54 is provided with four legs 62, 64, 66, and 68 extending from enclosing portion 58. Roller block cover 56 is also provided with four legs, three of the legs 72, 74, and 76 are shown in FIG. 2 extending from the roller enclosing portion 60. When mounted on the roller block 38, the legs of roller block cover 54 are in facing contact with the legs of roller block cover 56. The roller retention legs 62 and 64 of roller block cover 54 extend halfway along the sides of the straight raceway 40 and the roller retention legs 66 and 68 extend halfway along the straight raceway 44. Similarly the unshown leg and leg 72 of block cover 56 extend from the enclosing portion 60 halfway along the sides of straight raceway 40 and roller retention legs 74 and 76 extend from the roller enclosing portion 60 halfway along the sides of straight raceway 44. The straight raceways 40 and 44 contain the trunnion rollers 48 which are in exposed operating positions for contact with the outer races of the housing of the uni-versal joint.

Legs 62, 64, 66, and 68 each have rims 78, 80, 82 and 84, respectively. Legs 74 and 76 each have rims 90 and 92, respectively. Leg 72 also has a rim (not shown) and the fourth leg of roller block cover 56 has a rim. Rim 80 on leg 64 of roller block cover 54 and the rim on leg 72 of roller block cover 56 extend over the top trunnions of rollers 48. Rim 78 on leg 62 of roller block cover 54 and the rim on the fourth leg of roller block cover 56 extend over the bottom trunnions of rollers. Thus, the rollers in the straight raceway 40 are prevented from falling out of the roller block 38. Rim 82 on leg 66 of roller block cover 54 and rim 90 on leg 74 of roller block cover 56 extend over the top trunnions of rollers 48. Rim 84 on leg 68 of roller block cover 54 and rim 92 on leg 76 of roller block cover 56 extend over the bottom trunnions of rollers 48. Thus, the rollers in straight raceway 44 are prevented from falling out of the roller block 38.

A rectangular sleeve 94 fits over the roller block covers 54 and 56 to keep the roller block covers in place. Sleeve 94 has opposite open sides. One open side is adjacent the roller block straight raceway 40 with its rollers 48 in operating positions; the other open side is adjacent to the roller block straight raceway 44 with its roller 48 in the exposed operating positions. Opposite sides 100 and 102 of the sleeve 94 fit over the surfaces 58 and 60, respectively, of the roller block covers 54 and 56, respectively.

A centrally located opening 104 in the top 106 of the sleeve and a centrally located opening 108 in the bottom 110 of the sleeve are aligned with the central bore 112 of the roller block 38. Thus, the assembled bearing may be mounted over a bearing support 36 of the spider member 37 (see FIG. 1).

Referring to FIG. 6, the embodiment shown has a roller block 38 and outer sleeve 94 having the same structure as the roller block and outer sleeve shown in the embodiment of FIGS. 1 through 5, inclusive. However, instead of the end covers in the embodiment of FIGS. 1 through 5, generally rectangular roller block covers 113 and 114 are mounted over the top 116 and bottom (not shown), respectively, of the roller block 38.

The flat portions of the roller block covers 113 and 114 are in contact with the roller block 38 top and bottom, respectively. Roller block covers 113 and 114 each have a rim 118 and 120, respectively, extending perpendicularly from the flat portion along the entire flat portion border. Rim 118 of roller block cover 113 extends over the top trunnions of the rollers 48; rim 120 of the roller block cover 114 extends over the bottom trunnions of the rollers 48. In the assembled positions, the rectangular sleeve 94 fits over the roller block covers 113 and 114 to keep said covers in place. Since the sleeve has opposite open sides, each adjacent to a roller block straight raceway in the assembled position, it can be seen that rollers will be provided in opposite straight raceways in the exposed operating positions. The rims 118 and 120 on the block covers 113 and 114, respectively, prevent the trunnion rollers in the exposed operating positions from falling out of the roller block 38.

In the embodiment of FIGS. 7 through 10, inclusive, the generally rectangular roller block 122 has four straight raceway outer surfaces 124, 126, 128, and 130. The straight raceway outer surfaces are interconnected by curved raceways 132, 134, 136, and 138. There are a sufficient number of trunnion rollers 140 to completely occupy all of the raceways. However, the trunnion rollers 140 are loose enough to permit rolling contact with the straight raceways and curved raceways.

The roller block 122 has a cut-out portion around the entire outer periphery of each longitudinal end of the roller block 122. These cut-outs are defined by the transverse surface 141 and longitudinal surface 142 at one end of the roller block 122 and the transverse surface 144 and longitudinal surface 146 at the other end of the roller block 122.

A roller retaining member 148 is mounted in the cut-out formed by surfaces 144 and 146; a roller retaining member 150 is mounted in the cut-out formed by surfaces 141 and 142. Roller retaining member 148 has a roller enclosing portion 152 extending over the entire length of the rollers 140. Roller retaining member 150 has a roller enclosing portion 154 extending over the entire length of the rollers 140. Roller enclosing portion 152 extends along approximately one-fourth of the total border of the roller retaining member 148. The inside surface of roller enclosing portion 152 is spaced from and encloses straight raceway 126 and the adjacent curved raceways 132 and 134.

The roller enclosing portion 154 of roller retaining member 150 extends along approximately one-fourth of the entire border of roller retaining member 150 and has an inside surface spaced from and enclosing straight raceway 130 and its adjacent curved raceways 136 and 138. Thus, the roller enclosing portions 152 and 154 enclose opposite straight raceways and curved raceways leaving the trunnion rollers 140 on the opposite straight raceways 124 and 128 in the exposed operating positions.

A rim 156 on the roller retaining member 148 extends over the trunnions 158 of the rollers 140. The rim 156 extends approximately around three-quarters of the retaining member 148 border.

A rim 160 on the roller retaining member 150 extends over the trunnions 162 of the rollers 140. The rim 160 extends around approximately three-quarters of the retaining member 150 border. Thus, the rims 156 and 160 serve to retain the rollers 140 in straight raceways 124 and 128 from falling out of the bearing.

The bearing block 122 and the roller retaining members 148 and 150 have aligned bores to permit the mounting of the bearing assembly over the bearing support 36 extending from the spider member 37 of the universal joint.

Figure 11:
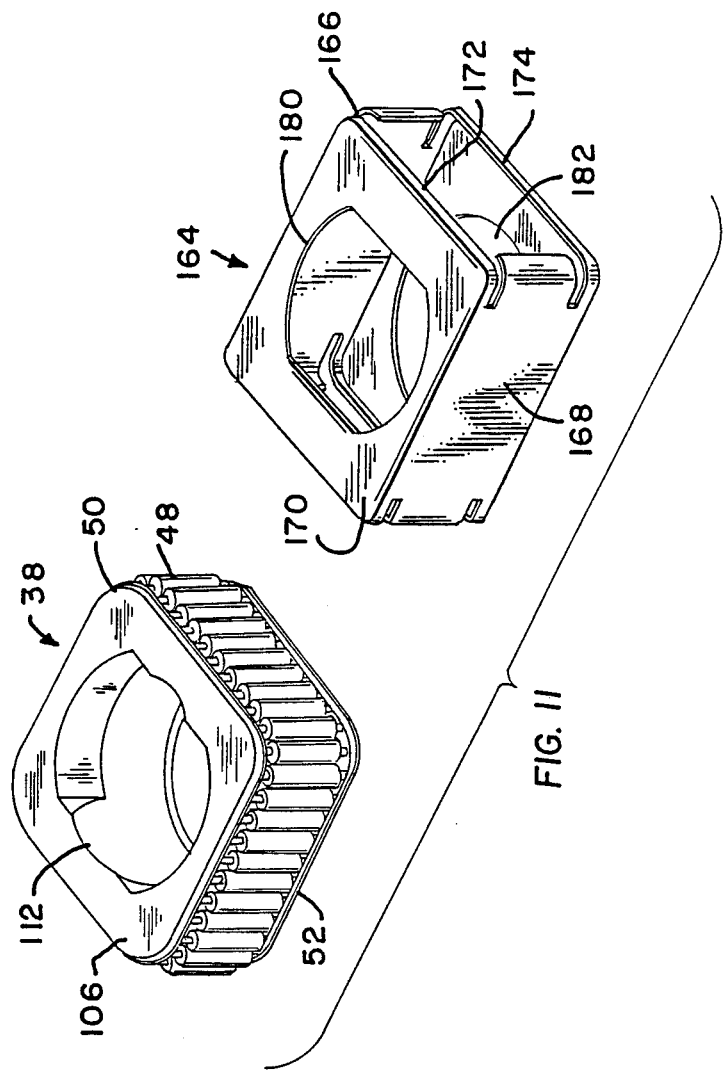
FIG. 11 is a exploded view of a fourth preferred embodiment of the invention.

The roller assembly embodiment shown in FIG. 11 consists of a single generally rectangular roller sleeve 164. The sleeve 164 has opposite roller enclosing portions 166 and 168. The roller enclosing portions 166 and 168 when assembled over the roller block 38 will be spaced from and enclose opposite straight raceways and adjacent curved raceways leaving opposite straight raceways with its rollers 48 in the exposed operating positions.

When assembled, the top 170 of the sleeve 164 and the bottom of the sleeve will lie against the top 106 and bottom respectively of the roller block 38.

Rims 172 and 174 extend perpendicularly from the flat top and bottom, respectively, of the sleeve 164. The rims 172 and 174 extend along the entire length of both sides of the one open side of the sleeve 164. Also, a pair of rims (not shown) extend perpendicularly from the top and bottom of the sleeve 164 along the entire length of the sides of the other open side of sleeve 164. The top rims extend over the top trunnions of rollers 48 when assembled over the bearing block 38 and the bottom rims extend over the bottom trunnions of rollers 48 to retain the rollers in the roller block which are in the exposed operating positions.

When assembled, the openings 180 and 182 in the top and bottom respectively of the sleeve 164 are aligned with the bore 112 in the roller block 38 so that the bearing assembly may be mounted in the universal joint by fitting a bearing support 36 on the spider member 37 in the bores of the bearing assembly.

We claim:

1. In a bearing having a generally rectangular roller block having four straight raceway outer surfaces and four curved raceway outer surfaces each end of each straight raceway being connected to an end of its adjacent straight raceways by a curved raceway outer surface, and
    a sufficient number of rolling members to completely occupy the straight raceways and curved raceways but loose enough to permit rolling contact with the straight raceways and curved raceways roller retaining means comprising:
    a pair of roller block covers, each having a roller enclosing portion with an inside surface spaced from and enclosing a straight raceway and its adjacent curved raceways, the block covers being mounted on said roller block so that the roller enclosing portions enclose opposite straight raceways and its adjacent curved raceways thereby providing opposite straight raceways with rollers in exposed operating positions, each block cover also having four roller retention legs facing, and in contact with the legs of the other block cover, each retention leg extending from its roller enclosing portion along a side of a straight raceway with rollers in exposed operating positions, and halfway toward the other roller enclosing portion, said roller retention legs having rims covering the ends of the rollers in exposed operating positions to retain said rollers in its straight raceway and
    a rectangular sleeve fitted over the roller block covers to keep said roller block covers in place, said sleeve having opposite open sides, each open side being adjacent to a roller block straight raceway with rollers in exposed operating positions.

2. In a bearing having a generally rectangular roller block, having four straight raceway outer surfaces and four curved raceway outer surfaces each end of each straight raceway being connected to an end of its adjacent straight raceways by a curved raceway outer surface, and
    a sufficient number of rolling members to completely occupy the straight raceways and curved raceways but loose enough to permit rolling contact with the straight raceways and curved raceways roller retaining means comprising:
    at lease one member having roller enclosing portions with inside surfaces spaced from and enclosing a straight raceway and its adjacent curved raceways, the roller enclosing portions enclosing opposite straight raceways and adjacent curved raceways thereby providing opposite straight raceways with rollers in exposed operating positions, said member having rims extending partially over those rollers in exposed operating positions to retain the rollers in the roller block.

3. A bearing in accordance with claim 2 wherein the roller retaining means comprises:
    a pair of roller block covers, each having a roller enclosing portion, and four roller retention legs facing and in contact with the legs of the other block cover, and the rims are located on the roller retention legs; and a rectangular sleeve is fitted over the roller block covers to keep said roller block covers in place, said sleeve having opposite open sides, each open side being adjacent to a roller block straight raceway with rollers in exposed operating positions.

4. A bearing in accordance with claim 2 wherein the roller retaining means comprises:
    a single generally rectangular roller retaining member.

5. A bearing in accordance with claim 2 wherein the roller retaining means comprises:
    a retaining member mounted on each end of the roller block, and each retainer member has a single roller enclosing portion along a portion of its border with the rest of the border having the rims.

6. A bearing in accordance with claim 2 wherein the roller retaining means comprises:
    a generally rectangular roller block cover mounted on the roller block top, and a generally rectangular roller block cover mounted on the roller block bottom, each cover has a rim extending around the entire border; and a generally rectangular sleeve fitted over the roller block covers, said sleeve has two opposite closed sides and two opposite open sides.

* * * * *